ns Patent [19]

Makino et al.

[11] Patent Number: 4,474,858
[45] Date of Patent: Oct. 2, 1984

[54] AROMATIC POLYIMIDE GAS-SEPARATING MEMBRANE

[75] Inventors: Hiroshi Makino; Yoshihiro Kusuki; Takashi Harada; Hiroshi Shimazaki; Tosio Isida, all of Ichihara, Japan

[73] Assignee: UBE Industries, Ltd., Yamaguchi, Japan

[21] Appl. No.: 393,820

[22] Filed: Jun. 30, 1982

[30] Foreign Application Priority Data

Jul. 10, 1981 [JP] Japan ................................ 56-107136

[51] Int. Cl.$^3$ .............................................. B01D 59/14
[52] U.S. Cl. .................................... 428/473.5; 55/158; 210/500.2; 521/61
[58] Field of Search ..................... 55/16, 158; 210/490, 210/491, 500.2; 521/61; 428/473.5

[56] References Cited

U.S. PATENT DOCUMENTS 3,899,309  8/1975  Hoehn et al. ..................... 55/158 X
4,113,628  9/1978  Alegranti ......................... 210/500.2
4,230,463 10/1980  Henu et al. ............................ 55/16
4,378,400  3/1983  Makino et al. ..................... 55/16 X Primary Examiner—Frank A. Spear, Jr.
Attorney, Agent, or Firm—Burgess, Ryan & Wayne

[57] ABSTRACT

An aromatic polyimide membrane having an excellent gas-separating property comprises (A) a substrate consisting of a porous membrane comprising at least one aromatic polyimide having at least 80 molar % of at least one type of recurring unit of the formula (I):

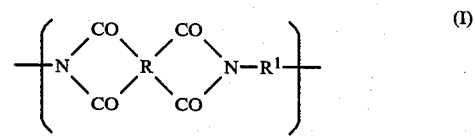

wherein R is a tetravalent aromatic radical and $R^1$ is a divalent aromatic radical, the porous membrane exhibiting a hydrogen gas permeability ($PH_2$) of $1 \times 10^{-5}$ to $5 \times 10^{-1}$ cm$^3$/cm$^2$.sec.cmHg and a ratio of hydrogen gas permeability ($PH_2$) to carbon monoxide gas permeability (PCO) of 2 to 5; and (B) 50% or more, based on the weight of the porous membrane substrate, of a gas-separating liquid contained in the porous membrane substrate, the gas-separating liquid being substantially incapable of dissolving therein the porous membrane substrate and having a boiling point of 180° C. or more.

7 Claims, No Drawings

AROMATIC POLYIMIDE GAS-SEPARATING MEMBRANE

FIELD OF THE INVENTION

The present invention relates to an aromatic polyimide gas-separating membrane. More particularly, the present invention relates to an aromatic polyimide gas-separating membrane comprising an aromatic polyimide porous membrane substrate impregnated with a gas-separating liquid.

BACKGROUND OF THE INVENTION

It is well-known that conventional cellulose ester porous membranes and polyvinyl alcohol porous membranes are usable as separating membranes for gas and/or liquid mixtures. It is also known that the gas-separating property of conventional porous membranes can be improved by impregnating the membranes with a gas-separating liquid, for example, water or an inorganic salt aqueous solution. Conventional liquid-impregnated porous membranes are, however, not always satisfactory since specific types of conventional liquid-impregnated porous membranes exhibit a poor gas-separating property in respect to certain types of gas mixtures.

Accordingly, for the purpose of obtaining a specific type of liquid-impregnated gas-separating membrane adequate for separating a specific type of gas mixture, it has been attempted to combine a specific type of polymeric porous membrane with the most adequate type of gas-separating liquid. In order to achieve this purpose, various types of gas-separating liquids have been investigated.

However, conventional polymeric porous membranes exhibit an unsatisfactory heat resistance and solvent resistance. Therefore, the gas-separating liquid to be combined with a specific type of porous membrane must be selected from a limited scope of liquids which do not dissolve therein the porous membrane. Also, the gas-separating operation must be carried out under limited conditions under which the porous membrane is not damaged.

The inventors of the present invention have made various attempts to produce aromatic polyimide porous membranes which exhibit an excellent resistance to heat and solvents. The inventors of the present invention found that the aromatic polyimide porous membranes could be impregnated with various types of gas-separating liquids which damage conventional polymeric porous membranes and that the resultant impregnated membranes exhibited an excellent gas-separating property. Especially, it was found by the inventors of the present invention that aromatic polyimide porous membranes impregnated with a specific type of gas-separating liquid exhibited an excellent gas-separating property in respect to hydrogen-carbon monoxide gas mixtures and nitrogen-oxygen gas mixtures.

SUMMARY OF THE INVENTION

An object of the present invention is to provide an aromatic polyimide gas-separating membrane exhibiting an excellent gas-separating property in addition to an excellent resistance to heat and solvents.

The above-mentioned object can be attained by the aromatic polyimide gas-separating membrane of the present invention which comprises: a substrate consisting of an aromatic polyimide porous membrane which comprises an aromatic polyimide material consisting essentially of at least one aromatic polyimide having at least 80 molar % of at least one type of recurring unit of the formula (I):

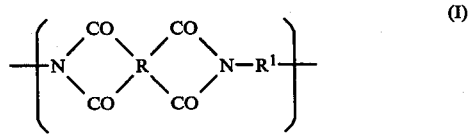

wherein R represents a tetravalent aromatic radical and $R^1$ represents a divalent aromatic radical and which exhibits a hydrogen gas permeability ($PH_2$) of from $1 \times 10^{-5}$ to $5 \times 10^{-1}$ cm$^3$/cm$^2$.sec.cmHg and a ratio ($PH_2$/PCO) of hydrogen gas permeability ($PH_2$) to carbon monoxide gas permeability (PCO) of 2 to 5, determined under a pressure 1 kg/cm$^2$; and 50% or more, based on the weight of the porous membrane substrate, of a gas-separating liquid uniformly impregnated in the porous membrane substrate and consisting of at least one liquid compound capable of separating gas, substantially incapable of dissolving therein the porous membrane substrate, and having a boiling point of 180° C. or more.

DETAILED DESCRIPTION OF THE INVENTION

The aromatic polyimide gas-separating membrane of the present invention comprises a specific type of substrate consisting of a specific aromatic polyimide porous membrane and a specific gas-separating liquid impregnated in the substrate.

The aromatic polyimide porous membrane usable for the present invention comprises an aromatic polyimide material consisting essentially of at least one aromatic polyimide having 80 molar % or more, preferably 90 molar % or more, of at least one type of recurring unit of the formula (I):

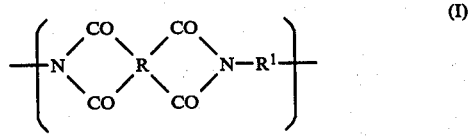

wherein R represents a tetravalent aromatic radical and $R^1$ represents a divalent aromatic radical.

Also, it is important that the aromatic polyimide porous membrane usable for the present invention exhibit a hydrogen gas permeability ($PH_2$) of from $1 \times 10^{-5}$ to $5 \times 10^{-1}$ cm$^3$/cm$^2$.sec.cmHg, preferably $5 \times 10^{-5}$ to $1 \times 10^{-1}$ cm$^3$/cm$^2$.sec.cmHg, and a ratio ($PH_2$/PCO) of hydrogen gas permeability ($PH_2$) to carbon monoxide gas permeability (PCO) of 2 to 5, preferably 2.5×4.5, determined under a pressure of 1 kg/cm$^2$. The method for measuring gas permeability will be described in detail hereinafter.

The tetravalent aromatic radical represented by R in the formula (I) may be selected from the group consisting of those of the formulae:

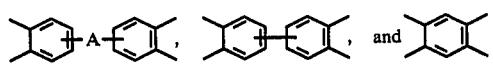

wherein A represents a divalent linking moiety selected from the group consisting of —O—, —S—, —CO—, —SO₂—, —SO—, —CH₂—, and —C(CH₃)₂—.

Also, the divalent aromatic radical represented by $R^1$ in the formula (I) may be selected from the group consisting of those of the formulae:

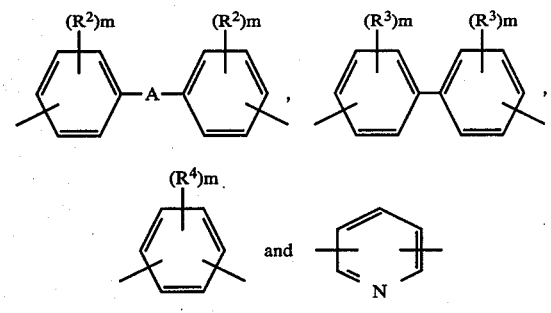

wherein A represents a divalent linking moiety selected from the group consisting of —O—, —S—, —CO—, —SO₂—, —SO—, —CH₂—, and —C(CH₃)₂—; $R^2$, $R^3$, and $R^4$ represent, independently from each other, a member selected from the group consisting of a hydrogen atom, lower alkyl radicals having 1 to 3 carbon atoms, and lower alkoxyl radicals having 1 to 3 carbon atoms, and $R^4$ may be a carboxylic moiety; and m represents an integer of 1 to 4.

The porous membrane substrate of the present invention is prepared from a solution containing an aromatic polyamic acid or polyimide by means of a dry or wet membrane-forming method.

The aromatic polyamic acid can be prepared by bringing about a polymerization reaction between approximately equimolar amounts of an aromatic tetracarboxylic acid component and an aromatic diamine component in a reaction medium at a temperature of 0° C. to 160° C.

The aromatic polyamic acid has at least 40 molar % of at least one type of recurring unit of the formula (II):

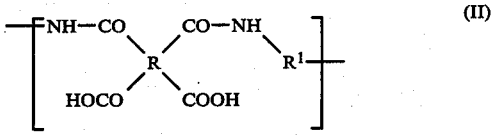

wherein R and $R^1$ are as defined above.

The polyamic acid can be converted into the corresponding aromatic polyimide by bringing about an imidization (imide ring cyclization) reaction at an elevated temperature of 160° C. or more.

The polymerization and imidization reactions may be carried out in a single step or sequentially in two or more steps by means of any conventional process.

The aromatic tetracarboxylic acid component comprises at least one aromatic tetracarboxylic acid compound which may be selected from the group consisting of biphenyl tetracarboxylic acids, for example, 3,3',4,4'-biphenyl tetracarboxylic acid, 2,3,3',4'-biphenyl tetracarboxylic acid, and 2,2',3,3'-biphenyl tetracarboxylic acid; benzophenone tetracarboxylic acids, for example, 3,3',4,4'-benzophenone tetracarboxylic acid and 2,3,3',4'-benzophenone tetracarboxylic acid; 2,2-bis(3,4-dicarboxyphenyl) propane; bis (3,4-dicarboxyphenyl) methane; bis (3,4-dicarboxyphenyl) sulfone; bis (3,4-dicarboxyphenyl) ether; bis (3,4-dicarboxyphenyl) thioether; pyromellitic acid; and anhydrides, salts, and lower alcohol esters of the above-mentioned acids.

The aromatic diamine component comprises at least one aromatic diamine compound which may be selected from the group consisting of diamino-diphenyl ether compounds, for example, 4,4'-diaminodiphenyl ether, 3,3'-dimethyl-4,4'-diaminodiphenyl ether, 3,3'-diethoxy-4,4'-diaminodiphenyl ether, and 3,3'-diaminodiphenyl ether; diaminodiphenyl thioether compounds, for example, 4,4'-diaminodiphenyl thioether and 3,3'-diaminodiphenyl thioether; diaminodiphenyl methane compounds, for example, 4,4'-diaminodiphenyl methane and 3,3'-diaminodiphenyl methane; diaminobenzophenone compounds, for example, 4,4'-diaminobenzophenone, 3,3'-diaminobenzophenone, and 3,3'-dimethyl-4,4'-diaminobenzophenone; diaminodiphenyl propane compounds, for example, 2,2-bis (4-aminophenyl) propane and 2,2-bis (3-aminophenyl) propane; diaminodiphenyl sulfoxide compounds, for example, 4,4'-diaminodiphenyl sulfoxide; diaminodiphenyl sulfone compounds, for example, 4,4'-diaminodiphenyl sulfone; biphenyldiamine compounds, for example, 3,3'-dimethyl benzidine and 3,3'-dimethoxy benzidine; o-, m-, and p-phenylenediamines; diaminopyridine compounds, for example, 2,6-diaminopyridine and 3,6-diaminopyridine, and 3,5-diaminobenzoic acid.

It is preferable that the aromatic polyimide material for the porous membrane substrate consist essentially of at least one aromatic polyimide having 90 molar % or more of at least one type of recurring unit of the formula (III):

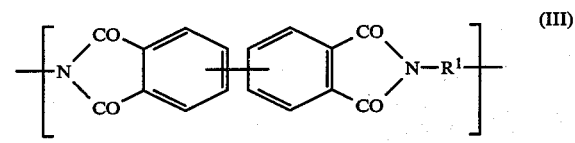

wherein $R^1$ is as defined above.

The aromatic polyimide porous membrane may be prepared from a solution containing the above-mentioned aromatic polyimide or polyamic acid material by any process. For example, an aromatic polyimide material consisting essentially of at least one aromatic polyimide having 90 molar % or more of at least one type of recurring unit of the formula (III) is dissolved in a polar organic solvent consisting of, for example, at least one phenolic liquid compound to prepare a dope solution. The phenolic liquid compound may be selected from phenol; alkyl-substituted monohydric phenol compounds, for example, o-, m-, and p-cresols, 3,5-xylenol, carvacrol, and thymol; and halogenated monohydric phenol compounds, for example, 3- and 4-chlorophenols, 3- and 4-bromophenols, 2-chloro-4-hydroxy toluene, and 2-bromo-4-hydroxytoluene.

In another example, an aromatic polyamic acid having 40 molar %, preferably 50 molar %, of the recurring unit of the formula (II), and the balance consisting of the recurring unit of the formula (I), is dissolved in a polar organic solvent consisting of at least one member selected from the group consisting of amide-type liquid compounds, for example, N,N-dimethylformamide, N,N-diethylformamide, N,N-dimethylacetamide, N,N-diethylacetamide, N-methyl caprolactam, and N-methyl-2-pyrrolidone; alkyl-sulfoxide-type liquid compounds, for example, dimethylsulfoxide and diethylsulfoxide; sulfone-type liquid compounds, for example, dimethyl sulfone, tetramethylenesulfone, and dimethyltetramethylene sulfone; alkyl urea-type liquid compounds, for example, tetramethyl urea and tetraethyl urea; and hexamethylphosphoramide.

The dope solution is shaped into a thin layer thereof, for example, by spreading it on a smooth surface of a membrane-forming base or by extruding it through a thin slit of an extruder. The thin layer of the dope solution is solidified by introducing it into a coagulating liquid consisting of, for example, methyl alcohol and/or acetone, but not water, and by drying the resultant coagulated membrane. In this wet membrane-forming procedure, it is important that the coagulating liquid contain no water. If water is contained, the resultant coagulating liquid causes the coagulated aromatic polyimide membrane not to exhibit the specific gas-permeating and gas-separating properties necessary for the substrate of the present invention.

The aromatic polyimide porous membrane may be produced by a dry membrane-forming process in which the thin layer of the dope solution is solidified by evaporating the solvent from the dope solution layer. In this dry membrane-forming process, it is preferable that the solvent comprises a mixture of a polar organic solvent capable of dissolving therein 5% by weight or more of the aromatic polymeric material and an additional aromatic liquid incapable of dissolving therein 3% by weight or more of the aromatic polymeric material and having a poorer evaporating rate than that of the polar organic liquid.

The process for producing the aromatic polyimide porous membrane for the substrate is not limited to the above-mentioned processes. That is, as long as the resultant membrane exhibits the necessary specific gas-permeating and gas-separating properties, the membrane can be produced by means of any process.

The aromatic polyimide porous membrane substrate is impregnated with 50% or more, preferably, from 55% to 380%, based on the weight of the porous membrane substrate, of a gas-separating liquid. The gas-separating liquid consists of at least one gas-separating liquid compound substantially incapable of dissolving therein the porous membrane substrate and having a boiling point of 180° C. or more, preferably 200° C. or more.

It is necessary that the gas-separating liquid compound be incapable of dissolving therein the porous membrane substrate in an amount of 1% by weight or more at room temperature, that is, 10° C. to 50° C.

Also, it is necessary that the gas-separating liquid compound exhibit a gas-separating property in respect to a gas mixture to be separated. The intensity of the gas-separating property of the liquid compound is variable depending on the type and physical properties of the gas mixture, the compatibility of the liquid compound with the gas mixture, and the type of gas to be separated from the gas mixture.

Furthermore, it is necessary that the gas-separating liquid compound have a boiling point of 180° C. or more. If the gas-separating liquid compound has an excessively low boiling point, a portion of the gas-separating liquid easily evaporates from the gas-separating membrane during the gas-separating procedure. That is, the composition of the gas-separating membrane changes with the lapse of gas-separating time. However, when the boiling point of the gas-separating liquid compound is 180° C. or more, preferably 200° C. or more, the amount of the gas-separating liquid which evaporates from the gas-separating membrane during the gas-separating procedure can be limited to a very small amount.

The freezing point of the gas-separating liquid compound is not limited to a specific range thereof as long as the gas-separating liquid compound is in a liquid state under the gas-separating conditions. Accordingly, it is preferable that the gas-separating liquid compound have a freezing point lower than the gas-separating temperature, for example, from room temperature, that is, 25° C., to approximately 50° C.

The gas-separating liquid compound usable for the present invention may be selected from the group consisting of halogenated naphthalenes, for example, α-chloronaphthalene and α-bromonaphthalene; alkylated naphthalenes, for example, methyl naphthalenes and ethyl naphthalens; other naphthalene derivatives, for example, 1- and 2-ethoxynaphthalenes, acetoxynaphthalene and 1,2- and 1,4-dihydronaphthalenes; aliphatic alcohols having 9 or more carbon atoms, preferably 9 to 17 carbon atoms, for example, nonyl alcohols and octyl alcohols; aliphatic mono-carboxylic acids having 5 or more carbon atoms, preferably 5 to 17 carbon atoms, for example, valeric acid, caproic acid, caprylic acid, and capric acid; aliphatic polyhydric compounds, for example, glycerine, propylene glycol, ethylene glycol, polymethylene glycols, diethylene glycol, and polyethylene glycols; and liquid silicone compounds, for example, polydimethylsiloxane, polymethylphenyl siloxane and polytrifluoropropylmethyl siloxane.

The preferable gas-separating compounds are halogenated naphthalenes, alkylated naphthalenes, and other naphthalene derivatives such as 1- and 2-ethoxynaphthalenes, acetoxynaphthalene and 1,2- and 1,4-dihydronaphthalene. The above-mentioned compounds exhibit excellent gas-separating properties, for example, a hydrogen-carbon monoxide gas-separating property and a nitrogen-oxygen gas-separating property and, therefore, are useful for enhancing the efficiency of the gas-separating procedure in which a porous membrane is used.

The gas-separating liquid can be applied to the porous membrane substrate by means of any process as long as a desired amount of the gas-separating liquid can be contained in the resultant gas-separating membrane. For example, a porous membrane substrate is immersed in a gas-separating liquid, preferably under a reduced pressure, and then is removed from the gas-separating liquid. Thereafter, a portion of the gas-separating liquid contained in the substrate is evaporated to obtain a desired amount thereof.

If the gas-separating liquid has a high viscosity at the immersing temperature, it is preferable that the gas-separating liquid be dissolved in a highly volatile solvent having a low viscosity and a low boiling point. In this case, the substrate is immersed in the gas-separating liquid-containing solution and then is removed from the solution. Thereafter, the volatile solvent is selectively evaporated from the solution so as to maintain a desired amount of the gas-separating liquid in the substrate.

In another process, the substrate is impregnated with a highly volatile solvent and then the solvent-impregnated substrated is immersed in the gas-separating liquid so as to replace the solvent by the gas-separating liquid. Finally, the gas-separating liquid-replaced substrate is dried under conditions adequate to maintain a desired amount of the gas-separating liquid in the substrate.

In still another process, the gas-separating liquid is introduced into the substrate in at least one step in a procedure in which a dope solution is converted into a solid membrane for the substrate.

The aromatic polyimide gas-separating membrane of the present invention is useful for separating at an excellent efficiency various types of gas mixtures, for example, hydrogen-carbon monoxide, nitrogen-oxygen, hydrogen-nitrogen, carbon dioxide-methane, helium-methane, and helium-nitrogen mixtures.

SPECIFIC EXAMPLES

Examples of the present invention and comparative examples are illustrated below.

In the examples and comparative examples, the gas permeability of the polyimide membrane was determined by the following gas transmission test. In the test, a membrane to be tested was placed in a stainless steel cell having a permeating area of 14.65 cm$^2$ and a gas to be tested was supplied to the cell at a temperature of 25° C. under a pressure of 1.0 kg/cm$^2$G. The amount (volume) of the gas passed through the membrane was measured by using a flow meter.

The gas permeability (P) of the gas was calculated from the following equation:

$$\text{Gas permeability }(P)\text{ }(cm^3/cm^2 \cdot sec \cdot cmHg) = X(A \times T \times D)$$

wherein X represents the amount (volume) in cm$^3$ (STP) of the gas passed through the membrane, A represents the permeating surface area in cm$^2$ of the membrane through which the gas passed, T represents the transmission time in seconds of the gas passed through the membrane, and D represents the difference in pressure in cmHg between the gas supply side and the opposite side of the membrane.

EXAMPLE 1

(Preparation of an aromatic polyimide)

A separable flask equipped with a stirrer and a conduit for introducing thereinto nitrogen gas was charged with a reaction mixture of 40 millimoles of 3,3',4,4'-biphenyl tetracarboxylic dianhydride, 40 millimoles of 4,4'-diaminodiphenyl ether, and 198 g of para-chlorophenol (PCP). The reaction mixture was subjected to a single step polymerization-imidization procedure by heating it from the ambient temperature to 180° C. over approximately 50 minutes and then by maintaining it at a temperature of 180° C. for 8 hours while stirring it and while flowing nitrogen gas through the conduit and the flask so as to produce an aromatic polyimide. A viscous uniform solution containing approximately 10% by weight of the aromatic polyimide was obtained.

The resultant aromatic polyimide exhibited a logarithmic viscosity of 2.2 determined in a concentration of 0.5 g per 100 ml of para-chlorophenol at a temperature of 50° C. and a degree of imidization of at least 95%.

The logarithmic viscosity of the polyimide was calculated in accordance with the following equation.

$$\text{Logarithmic viscosity} = \frac{\text{natural logarithm}\left(\frac{\text{viscosity of solution}}{\text{viscosity of solvent}}\right)}{\text{concentration of polymer in solution}}$$

The degree of imidization of the polyimide was determined from the height of the infrared absorption peaks at 1780 cm$^{-1}$ and 720 cm$^{-1}$.

EXAMPLE 2

(Preparation of a porous membrane)

The viscous uniform solution of the polyimide obtained in Example 1 was spread on a smooth surface of a glass plate at a temperature of 25° C. so as to form a thin solution layer having a thickness of 0.2 mm.

The thin solution layer was immersed in a coagulating liquid consisting of methyl alcohol alone at the ambient temperature for approximately 20 hours. The resultant coagulated membrane was, without drying it, immersed in benzene at a temperature of 20° C. for 20 hours. The resultant membrane impregnated with benzene was air dried at a temperature of 25° C. for 2 hours, and heat dried at a temperature of 100° C. for one hour, and then at a temperature of 200° C. for 2 hours. An aromatic polyimide porous membrane having a thickness of approximately 40 microns and usable for a substrate was obtained.

EXAMPLE 3

The aromatic polyimide porous membrane substrate described in Example 2 was immersed in n-hexane at a temperature of 25° C. for 20 minutes. The immersed porous membrane substrate was removed from the n-hexane and then, without removing the n-hexane contained in the porous membrane substrate, was immersed in α-chloronaphthalene at a temperature of 25° C. for 20 minutes so as to replace the n-hexane by the α-chloronaphthalene. The resultant porous membrane substrate impregnated with α-chloronaphthalene was dried at room temperature for 4 hours while flowing air through the dryer. The resultant aromatic polyimide gas-separating membrane contained 350% of α-chloronaphthalene based on the weight of the porous membrane substrate.

The gas-separating membrane was subjected to a gas-permeating test. The results are indicated in Table 1.

EXAMPLE 4

The same procedures as those described in Example 3 were carried out except that α-chloronaphthalene was replaced by 360% by weight of a liquid silicone (commercially available under the trademark of SRX310, manufactured by Toray Silicone Co.) based on the weight of the porous membrane substrate.

The results of the gas-permeating test to which the resultant gas-separating membrane was subjected are indicated in Table 1.

COMPARATIVE EXAMPLE 1

The same aromatic polyimide porous membrane substrate as that used in Example 3 was subjected, without impregnating it with α-chloronaphthalene, to a gas-permeating test. The results are indicated in Table 1.

TABLE 1

| | Example No. | | |
|---|---|---|---|
| | Example 3 | Example 4 | Comparative Example 1 |
| Type of gas-separating liquid | α-chloro naphthalene | Liquid silicone | none |
| PH$_2$ (cm$^3$/cm$^2 \cdot$ sec. cmHg) | $4.5 \times 10^{-6}$ | $2.8 \times 10^{-5}$ | $7.2 \times 10^{-3}$ |

TABLE 1-continued

| | Example No. | | |
|---|---|---|---|
| | Example 3 | Example 4 | Comparative Example 1 |
| $P_{H_2}/P_{CO}$ | 23 | 5.7 | 3.0 |
| $P_{O_2}$ (cm³/cm²·sec·cmHg) | $1.1 \times 10^{-6}$ | — | $2.1 \times 10^{-3}$ |
| $P_{O_2}/P_{N_2}$ | 6.3 | — | 0.9 |

EXAMPLE 5

A dope solution was prepared by dissolving 7.0% by weight of a polyamic acid prepared by the polymerization of equimolar amounts of 3,3',4,4'-biphenyltetracarboxylic dianhydride and 4,4'-diaminodiphenyl ether, in the solvent consisting of a mixture of one part by weight of N-methyl-2-pyrrolidone and 0.48 parts by weight of α-chloronaphthalene. The polyamic acid had a logarithmic viscosity of 1.92.

The dope solution was spread on a smooth surface of a glass plate so as to form a thin layer thereof having a thickness of 0.2 mm. The thin dope solution layer was dried in air for 4 hours and then was heated at a temperature of 100° C. for 3 hours so as to imidize the polyamic acid into the corresponding polyimide.

The resultant aromatic polyimide gas-separating membrane is composed of a porous membrane substrate and 60% of α-chloronaphthalene based on the weight of the porous membrane substrate, which was measured by means of the method described in Comparative Example 2 hereinbelow. The gas-separating membrane was subjected to a gas-permeating test. The results are indicated in Table 2.

COMPARATIVE EXAMPLE 2

The same gas-separating membrane as that described in Example 5 was immersed in methyl alcohol at room temperature for 24 hours to remove α-chloronaphthalene and then the resultant porous membrane was dried in air for 24 hours.

The resultant porous membrane was subjected to a gas-permeating test. The results are indicated in Table 2.

TABLE 2

| | Example No. | |
|---|---|---|
| Item | Example 5 | Comparative Example 2 |
| Type of gas-separating liquid | α-chloro naphthalene | none |
| $P_{H_2}$ (cm³/cm²·sec·cmHg) | $1.0 \times 10^{-6}$ | $7.2 \times 10^{-5}$ |
| $P_{H_2}/pCO$ | 95 | 2.7 |

We claim:

1. An aromatic polyimide gas-separating membrane comprising:
   a substrate consisting of an aromatic polyimide porous membrane which comprises an aromatic polyimide material consisting essentially of at least one aromatic polyimide having at least 80 molar % of at least one type of recurring unit of the formula (I):

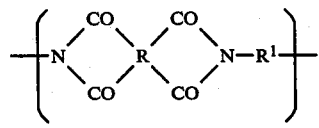

wherein R represents a tetravalent aromatic radical and R¹ represents a divalent aromatic radical and which exhibits a hydrogen gas permeability ($P_{H_2}$) of from $1 \times 10^{-5}$ to $5 \times 10^{-1}$ cm³/cm².sec.cmHg and a ratio ($P_{H_2}/P_{CO}$) of hydrogen gas permeability ($P_{H_2}$) to carbon monoxide gas permeability ($P_{CO}$) of 2 to 5, determined under a pressure of 1 kg/cm²; and at least 50%, based on the weight of said porous membane substrate, of a gas-separating liquid uniformly impregnated in said porous membrane substrate said gas-separating liquid consisting essentially of at least one liquid naphthalene compound substantially incapable of dissolving therein said porous membrane substrate, and having a boiling point of at least 180° C.

2. The gas-separating membrane as claimed in claim 1, wherein said tetravalent aromatic radical represented by R in the formula (I) is selected from those of the formulae:

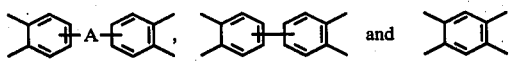

wherein A represents a divalent linking moiety selected from the group consisting of —O—, —S—, —CO—, —SO₂—, —SO—, —CH₂—, and —C(CH₃)₂—.

3. The gas-separating membrane as claimed in claim 1, wherein said divalent aromatic radical represented by R¹ in the formula (I) is selected from those of the formulae:

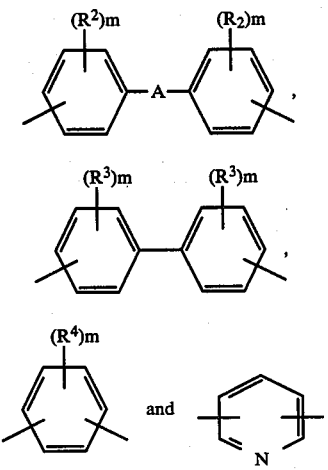

wherein A represents a divalent linking moiety selected from the group consisting of —O—, —S—, —CO—, —SO₂—, —SO—, —CH₂—, and —C(CH₃)₂—; R², R³, and R⁴ represent, independently from each other, a member selected from the group consisting of a hydrogen atom, lower alkyl radicals having 1 to 3 carbon atoms, and lower alkoxyl radicals having 1 to 3 carbon atoms; and m represents an integer of 1 to 4.

4. The gas-separating membrane as claimed in claim 1, wherein said aromatic polyimide material for said porous membrane substrate consists essentially of at least one aromatic polyimide having at least 90 molar % of at least one type of recurring unit of the formula (II):

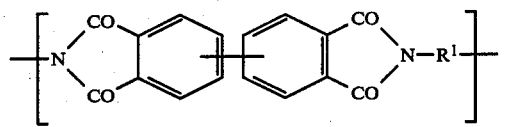

wherein $R^1$ is as defined above.

5. The gas-separating membrane as claimed in claim 1, wherein said liquid compound in said gas-separating liquid is incapable of dissolving therein said porous membrane substrate in an amount of 1% by weight or more at room temperature.

6. The gas-separating membrane as claimed in claim 1, wherein said liquid compound in said gas-separating liquid has a boiling point of 200° C. or more.

7. The gas-separating membrane as claimed in claim 1 wherein said gas-separating liquid is at least one compound selected from the group consisting of halogenated naphthalenes and alkylated naphthalenes.

* * * * *